United States Patent
Slater et al.

[11] Patent Number: 5,822,038
[45] Date of Patent: Oct. 13, 1998

[54] APPARATUS FOR STRETCHING AND ALIGNING FILM SHEETS

[75] Inventors: Daniel A. Slater, Rochester; Raymond P. Chapman, Fairport; Jayson J. Nelson, Webster, all of N.Y.

[73] Assignee: Eastman Kodak Company, Rochester, N.Y.

[21] Appl. No.: 911,289

[22] Filed: Aug. 14, 1997

[51] Int. Cl.$^6$ .......................... G03B 27/20; G01B 11/00
[52] U.S. Cl. ...................... 355/22; 355/91; 356/373; 356/401; 359/463
[58] Field of Search ........................... 356/399, 400, 356/401, 373; 250/548, 559.3; 355/22, 53, 72, 73, 75, 76, 91, 95; 359/463, 619, 620, 621, 622, 623, 628, 455, 458; 430/946

[56] References Cited

U.S. PATENT DOCUMENTS

| | | | |
|---|---|---|---|
| 5,278,608 | 1/1994 | Taylor et al. | 355/22 |
| 5,391,254 | 2/1995 | Morton | 156/494 |
| 5,534,969 | 7/1996 | Miyake | 355/53 |
| 5,633,719 | 5/1997 | Oehlbeck et al. | 356/401 |
| 5,689,340 | 11/1997 | Young | 356/401 |

FOREIGN PATENT DOCUMENTS

0763755A2  3/1997  European Pat. Off. .......... G02B 3/00

*Primary Examiner*—A. A. Mathews
*Attorney, Agent, or Firm*—Arthur H. Rosenstein

[57] ABSTRACT

A method and apparatus for stretching and aligning film sheets to a lenticular substrate comprising supporting members for the film sheet, two actuator assemblies positioned on opposite sides of a film sheet with a rigid bar member connecting the actuator means, "flexible" clamping members to engage the edges of the film sheet, a constraint member for the film sheet and lenticular substrate and detection means to detect errors in positioning of the film sheet image (substrate) and lenticular substrate.

7 Claims, 8 Drawing Sheets

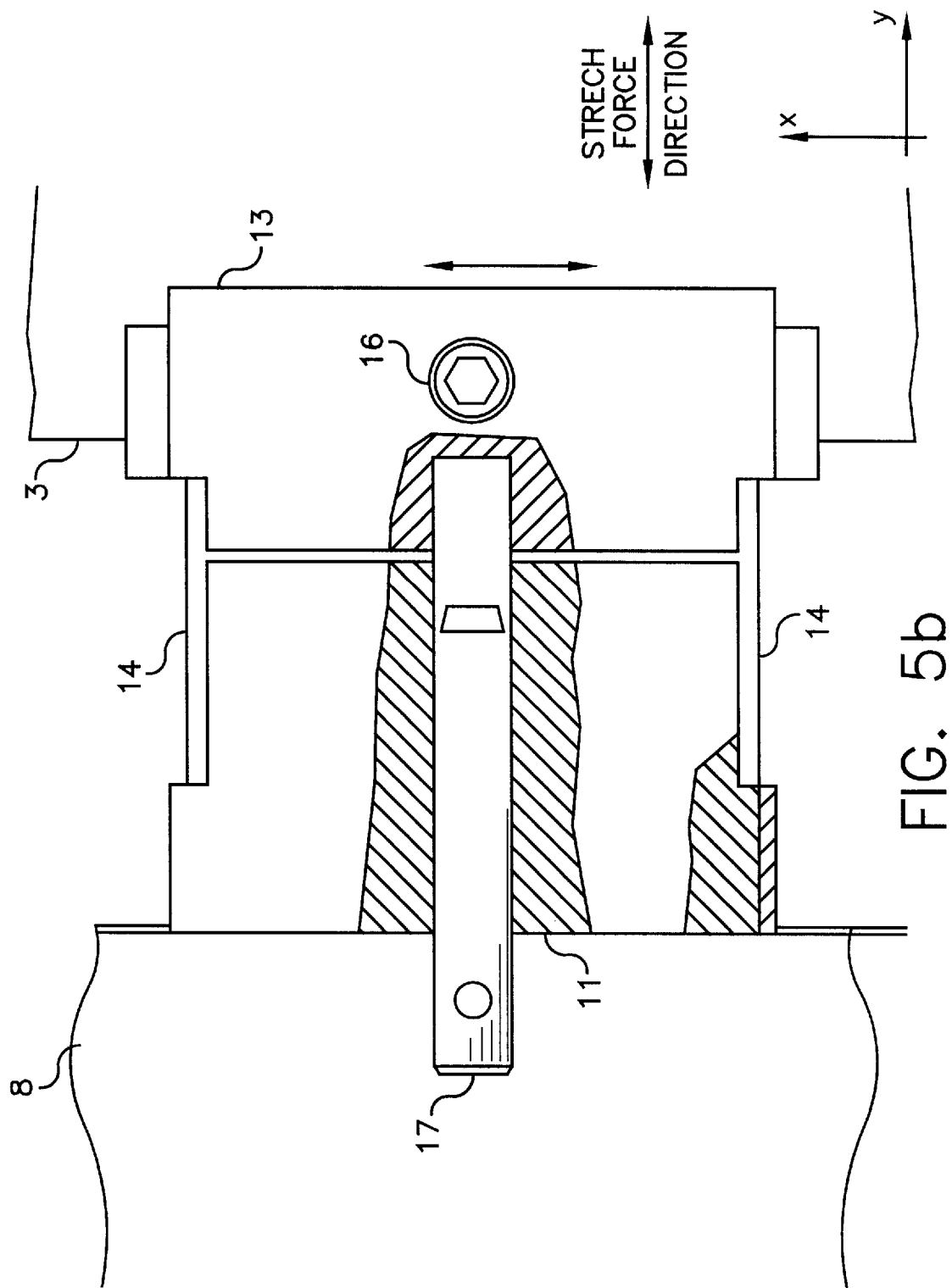

APPARATUS FOR STRETCHING AND ALIGNING FILM SHEETS

FIELD OF THE INVENTION

The invention relates to an apparatus for stretching and aligning an elastomeric film sheet to a lenticular substrate in an exposing process (contact printing) to produce high quality dynamic images.

BACKGROUND OF THE INVENTION

Currently, production of "dynamic images" (images which appear to move and/or have 3D effect) requires a negative having the desired image(s). From that negative image, a positive image is generated via a contact printing process. Next, the positive image sheet is aligned to a sheet of lenticular media, and finally the positive image sheet is adhered to the lenticular media. This is a very costly operation with many processing steps and high amounts of waste. One of the most critical processes is that of aligning the "image lines" on the positive image sheet to the lenticules of the lenticular media. Process yield, depending upon the requirements of the image, as viewed by the customer, varies from 20% to 80%. The yield loss is largely due to 1) raw material dimensional variability (lenticule pitch spacing), 2) printed image variability (line-to-line spacing) and 3) misalignment of one media to the other during the alignment and adhesion processes. Currently, the image sheet is aligned to the lenticular sheet, visually, usually until the "best fit" alignment is achieved. This alignment frequently shifts during the lamination process making the final print unacceptable. Furthermore, there is currently no way to accommodate the mis-alignment and critical registration of the lenticule pitch spacing and the image lines spacing. Therefore, manufacturing is currently limited to small image sizes and small number of views per image. It is highly desirable to reduce the number of manufacturing process steps, and improve product quality and yield.

One method to improve the processes and product is to use emulsion coated lenticular film and to project a latent image from the original negative directly onto the lenticular film via a contact printing process. Photographic lenticular film and contact printing are described in a number of U.S. Patents, for example U.S. Pat. No. 5,278,608. A critical process step remains that of aligning the image (on the negative) to the lenticules of the coated lenticular media, prior to exposing the latent image to the lenticular film. The imaging industry is currently striving to obtain higher image quality standards, including more discrete views/image, more lenticules/inch, and thinner media. However, to achieve these goals, inherent variabilities in the incoming materials (lenticular pitch spacing, line spacing on the negative image, and many other factors) must be compensated for. Thus, it is necessary to compensate for many of these deficiencies by providing the ability to selectively "stretch and align" the negative image sheet with respect to the lenticular media to very precise tolerances.

Prior art, as described in U.S. Pat. No. 5,391,254, refers to a method of aligning an image to a lenticular media which requires the image and film to be formed in a curved manner. U.S. Pat. No. 5,534,969, describes a number of methods of gripping and aligning of a photo mask film to a substrate. All methods refer to gripping of the sheet (photo mask) along all sides to accommodate equilateral forces along the sheets' perimeter. It refers to a plurality of independent actuators, each having an independent clamping mechanism and each activated individually. It also refers to each actuator being capable of exerting a predictable force at the point of attachment to the web. It describes "plain" photo masks as well as photo masks having apertures along the perimeter. It also describes a multitude of clamping mechanisms, some that claim to be compliant in one direction, but not in another.

The apparatus described in U.S. Pat. No. 5,534,969, is not acceptable for the following reasons:

In FIG. 6, it describes a plurality of stretching units along all four sides of the photo-mask; and It describes a plurality of complex stretching mechanisms, consisting of upper and lower gripper jaws, air cylinder actuators, each mounted to a separate base plates, which in turn, are mounted to separate slide/bearings, oriented 90 degrees to the direction of stretch. In addition, the gripper jaws are capable of pivoting about a center pin. It is desirable to provide a significantly less complex design of stretching units, yet maintain their critical functionality.

It describes a plurality of stretching units, each air cylinder actuated, which exerts a measurable force to the substrate. In many applications however, it is more desirable to exert a known displacement to the stretching mechanism, regardless of force required to do so. Due to material thickness variations in the negative sheet, uniform forces will result in non-uniform amounts of stretch.

The '969 Patent describes a plurality of stretching units, each being "selectively actuated" to impart some amount of stretch by means of a processor. It is desirable, however, to minimize the number of devices that need to be actuated, yet be able to obtain the required positional accuracy of the substrate being stretched.

SUMMARY OF THE INVENTION

The primary objective of this invention is to provide a technique for gripping, stretching, and aligning of a film sheet with respect to another media (i.e., lenticular film) in a manner that will permit maximum "stretch" in one direction, yet minimize deformation of the parallel image lines within the central-most image zone of the film sheet.

The design of the new apparatus accommodates uniform stretching of the image substrate so as to maintain the critical alignment (straightness, skew and parallelism) of the image lines within the image zone for stretch amounts of up to 1000 parts/million (0.10% of total length of substrate), utilizing fewer and simpler mechanisms. In the present application, it is not necessary to grip and stretch the image substrate sheet from all sides, in that of most concern is uniformly stretching along (1) axis, only. The direction of stretch must be perpendicular to the direction of the lenticules and image lines. It is also highly desirable to replace a plurality of individually controlled actuators with a few (no more than 4) electronically controlled, high precision actuators, to simplify and improve on the basic design of the mechanisms, yet obtain the required positioning results.

From Poisson's Ratio, if the film sheet is clamped uniformly along two opposite edges and then stretched (along the -Y- axis) some finite distance, stresses would be induced that would cause the sheet to become narrower in the -X- direction as well as inducing non-uniform displacements in both the -X- and -Y- directions, especially along the (2) outer, unconstrained edges. Finite element analysis indicates that when clamped continuously along the (2) opposing edges, non-uniform and undesirable stresses begin to occur. These distortions become progressively greater in magnitude towards the outer edges of the sheet as more stretch is induced. Analysis also indicates that replacing a long continuous clamp with a series of stationary "point clamps" is only a slight improvement. However, if a series of clamping "points" are combined with allowing the points to be compliant in the direction perpendicular to the direction of elongation, distortion of image lines within the film sheet can be minimized. This allows more stretching (elongation) of the image with less distortion, especially along the outer edges of the image. This invention describes an apparatus that accomplishes limited linear elongation of the negative by using compliant gripping members.

Thus, the present invention comprises an apparatus for aligning a substrate having a plurality of image lines and a plurality of positioning patterns for exposure to a lenticular substrate, said apparatus comprising:

a) a substrate having an image pattern consisting of a plurality of parallel image lines and a plurality of positioning patterns, b) a substrate supporting member which supports the substrate containing the image pattern c) two actuator assemblies positioned on opposite sides of an image substrate, each actuator assembly including: a rigid bar member that connects to the two actuator means, one on each end;

d) a plurality of compliant substrate clamping members connected to the rigid bar member, which engage to edges of the negative image substrate;

e) lenticular film substrate having a plurality of parallel lenticular features f) a constraint member for the lenticular substrate support comprising a plurality of vacuum grooves, connected to an actuator member to cause the lenticular substrate to be uniformly engaged with the image substrate, when supported by the image substrate support member and while clamped along an outer periphery of said support member.

g) a detecting means which detects the relative position of the positionary pattern of said image substrate and positionary features of said lenticular substrate and which detects errors in position of the image substrate with respect to the lenticular substrate, when supported by the image substrate support member and clamped along the outer periphery; wherein said actuator assemblies include actuating means which elastically deform (stretch) and reposition the image substrate so as to correct for errors detected by said detecting means.

BRIEF DESCRIPTION OF THE DRAWINGS

FIG. 5a and 5b are detailed drawings of the flexible clamp assembly. In FIG. 5b, locking pin (17) is shown disengaged.

For a better understanding of the present invention, together with other and further objects, advantages and capabilities thereof, reference is made to the following detailed description and appended claims in connection with the preceding drawings and description of some aspects of the invention.

DETAILED DESCRIPTION OF THE PREFERRED EMBODIMENTS

The following is a detailed description of the preferred embodiments of the invention.

Figure 1:
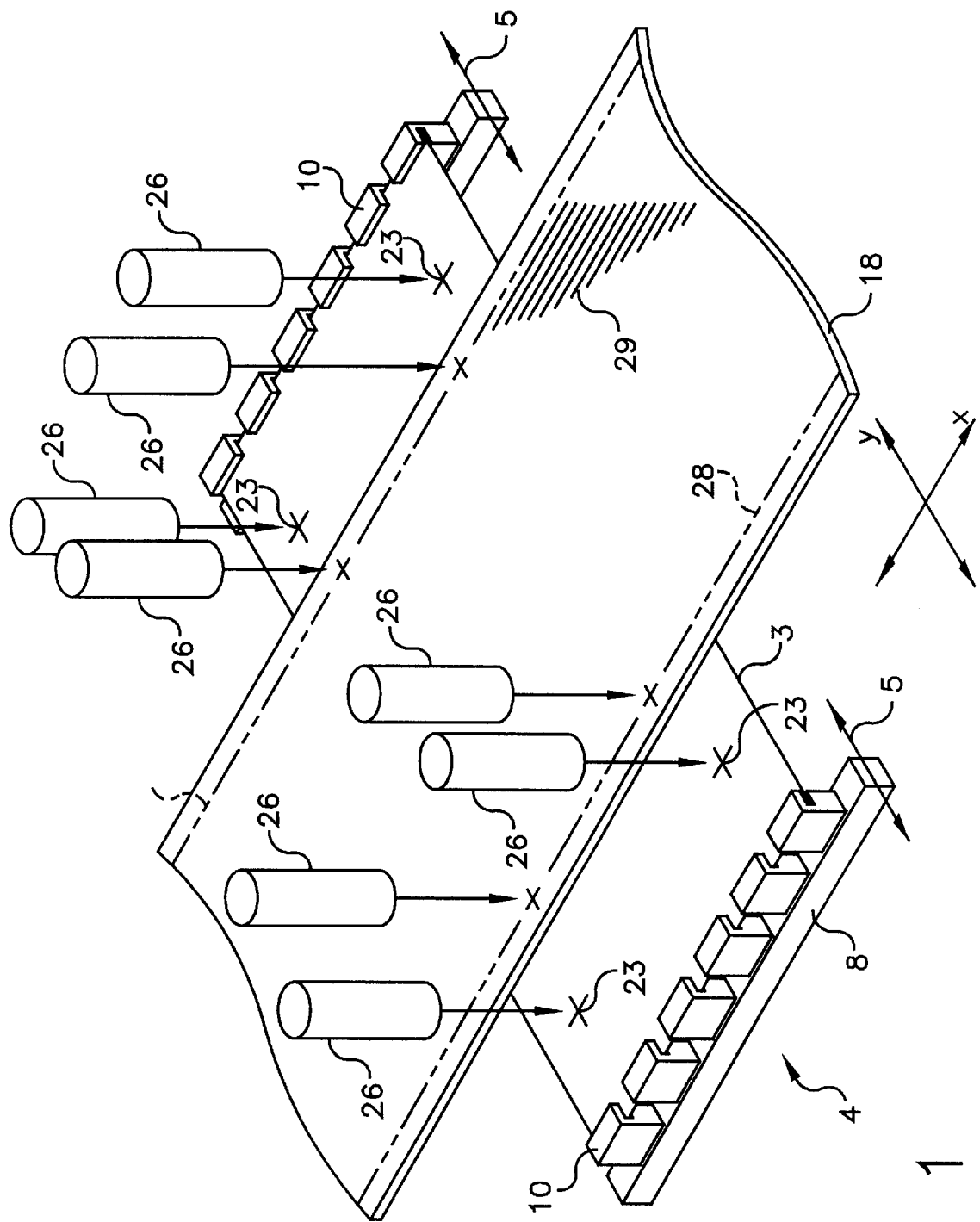
FIG. 1 is a schematic diagram of the stretching and aligning system.
Figure 2:
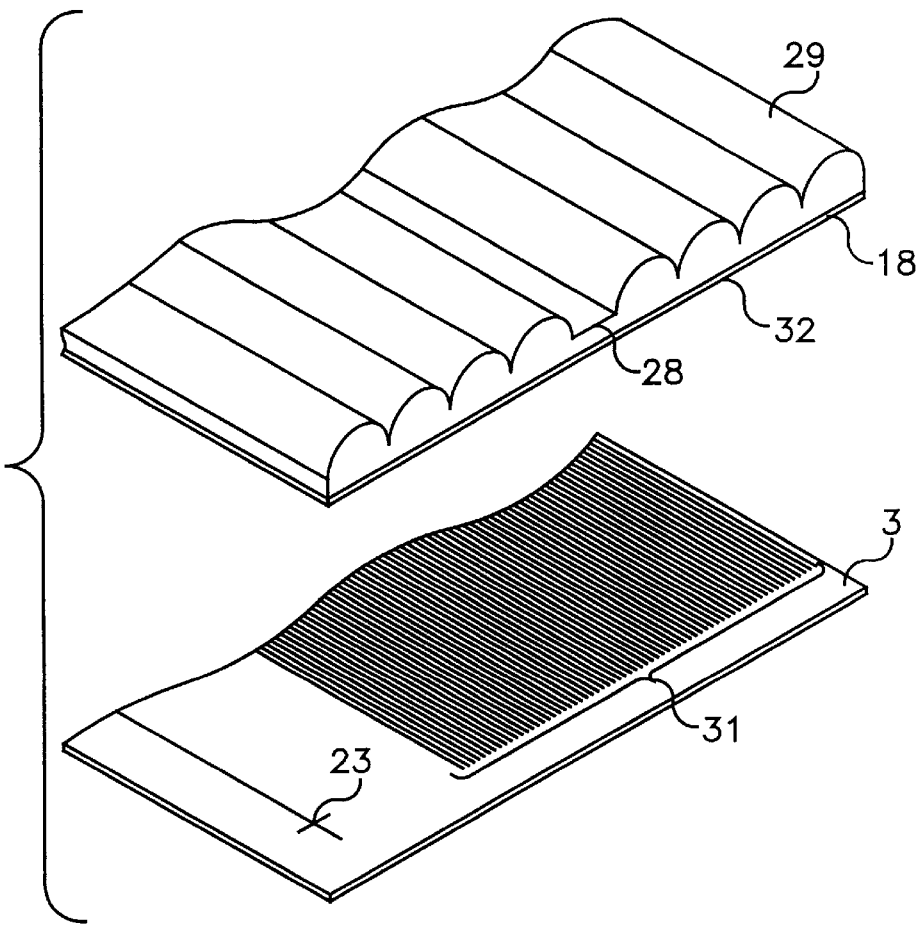
FIG. 2 is a schematic diagram of the profiles and features of the lenticular substrate and the image substrate.
Figure 3:
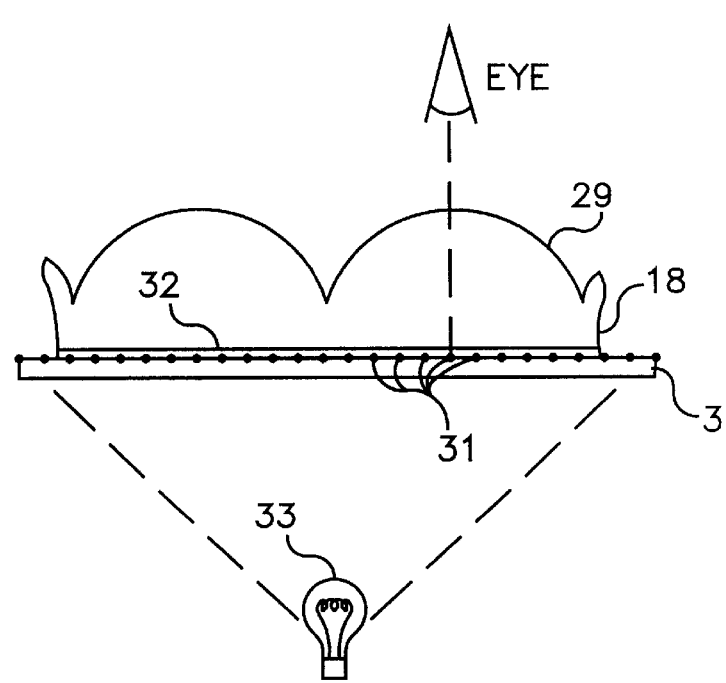
FIG. 3 is a schematic diagram of the alignment interface of the image substrate and the lenticular substrate during the exposure cycle.
Figure 4:
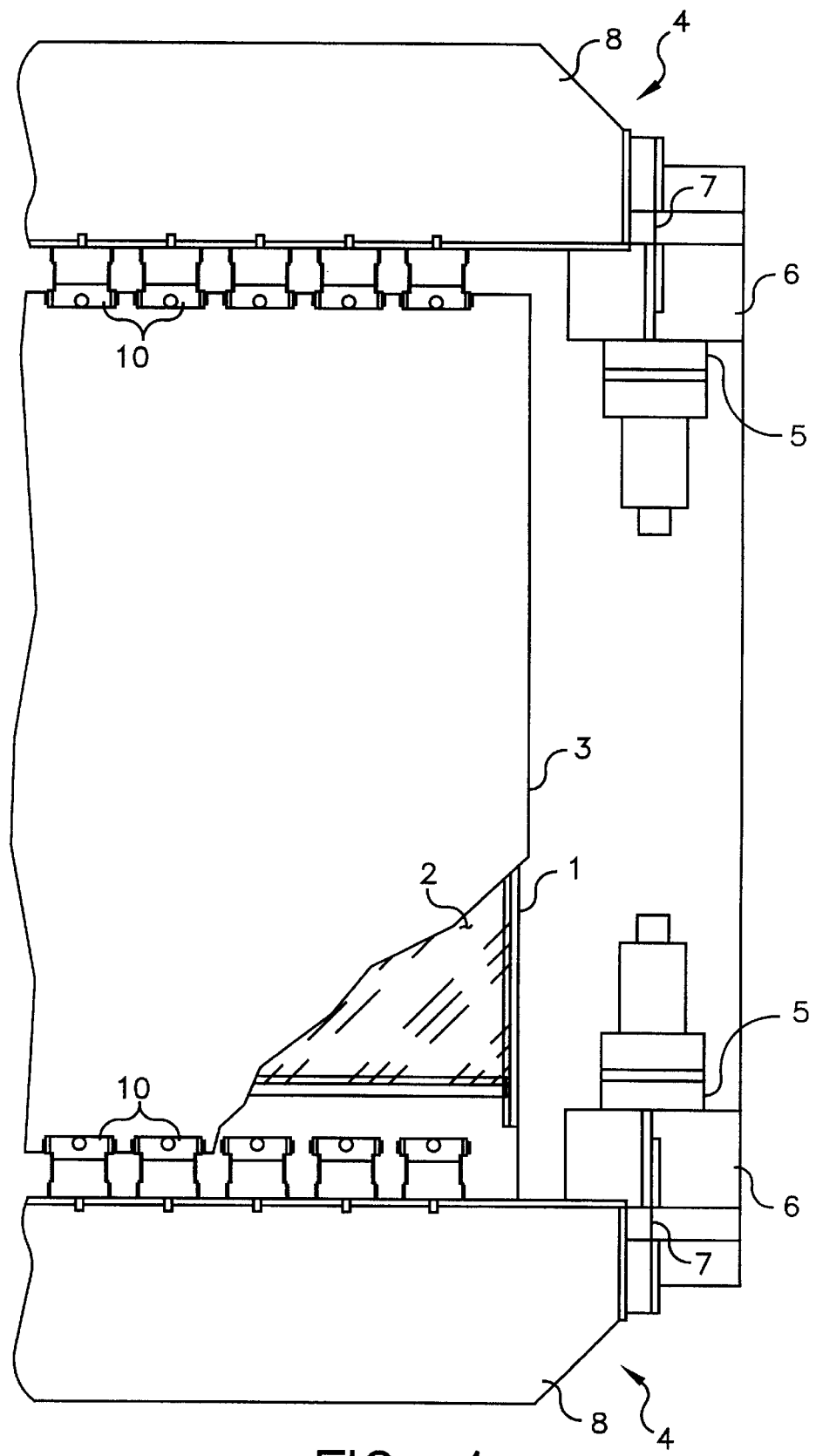
FIG. 4 is a general configuration drawing of the image substrate stretching assembly.
Figure 5A:
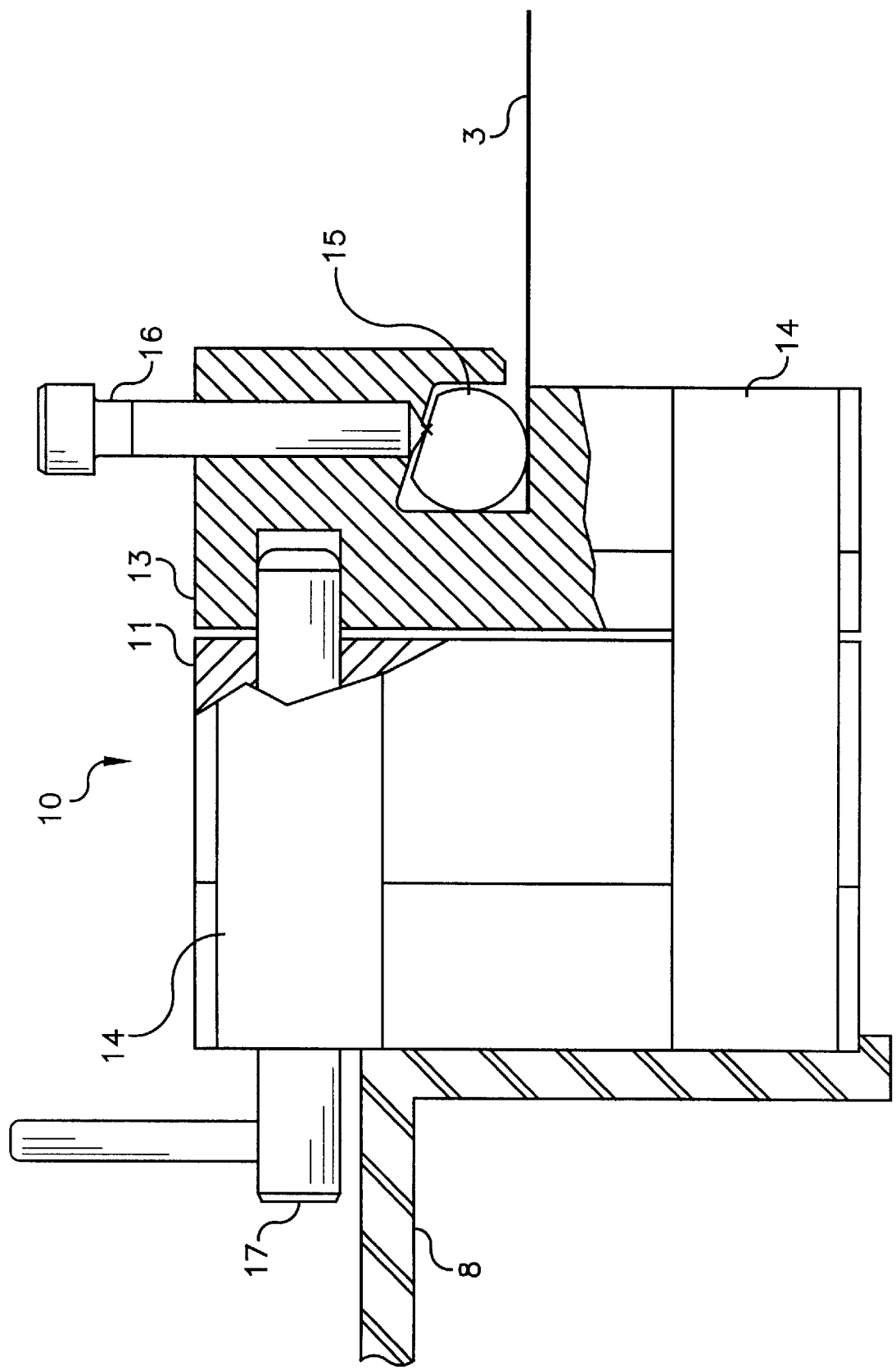

Referring to FIGS. 2 and 3, the lenticular substrate (18) is a transparent media, consisting of a plurality of small, parallel, lens-like lenticular features (29) on one surface with the opposite surface being smooth, and coated with a light-sensitive emulsion (32). The image substrate (3) is a transparent media, consisting of a plurality of narrow image lines (31) and image substrate fiducial pattern lines (23) running parallel to the direction of the lenticular features (29) of the lenticular substrate (18). To manufacture "dynamic images", the image substrate (3) must be aligned to the lenticular substrate (18) so that the image lines (31) are in proper alignment to the corresponding lenticular features (29) so that when viewed from a specified viewing distance and angle, the proper image is seen. Once that alignment is achieved, the exposure system (33) will emit light so as to generate a latent image onto the emulsions (32) of the lenticular substrate (18).

In most cases, to achieve this critical alignment, the image substrate (3) must be not only aligned, but also stretched, so as to compensate for minute amounts of lenticular feature (29) pitch spacing variability across the width of the lenticular substrate (18). The remaining figures describe the mechanisms required to achieve the critical alignment specifications.

Referring to FIGS. 1, 4, 5a, and 5b, the apparatus of the invention may include a rigid frame (1) and a sheet of plate glass (2) to support the image substrate (3). Four independently controlled motor driven linear actuators (5) are connected to the frame, one unit in each corner of the frame (1). There are two stretcher bar assemblies (4) located at opposite edges of the image substrate (3). Each stretcher bar assembly (4) is connected to two motor driven linear actuators (5) so as to provide the displacement to stretch the image substrate (3). The stretcher bar assemblies (4) are attached to each motor driven linear actuator (5) via a flexure mounting bracket (6). A pivot flexure (7) connects the flexure mounting bracket (6) to the adjusting bar (8). Connected to the adjusting bar (8) are a plurality of compliant image substrate clamp assemblies (10). By compliant, it is meant that the clamp assembly (10) is rigid (non-elastic) in the direction of pull/stretch, but is compliant (free to move) in the direction perpendicular (⊥) to the direction of pull/stretch. Each clamp assembly (10) consists of mounting block (11) which is rigidly connected to the adjusting bar (8). An image substrate clamp block (13) is connected to the mounting block (11) by four discreet flexures (14). These flexures permit the clamping block (13) to be constrained in the direction of desired elongation of the film (the -y- axis), yet compliant in the direction perpendicular to the direction of elongation (the -x- axis) in the plane of the film sheet being elongated. The image substrate (3) is retained into the clamping block (13) by a clamping rod (15) and a clamping force which is generated by applying torque to a clamping screw (16). To prevent the clamping block (13) from flexing in the -x- axis direction while the image substrate (3) is being clamped in position, a locking rod (17) is inserted through a hole in the mounting block (11) and engaged into a mating hole in the clamping block (13). The locking rod (17) must be disengaged (see FIG. 5b) from clamp block (13), after the image substrate (3) has been securely clamped at all clamping assemblies (10), to permit proper operation.

Figure 6:
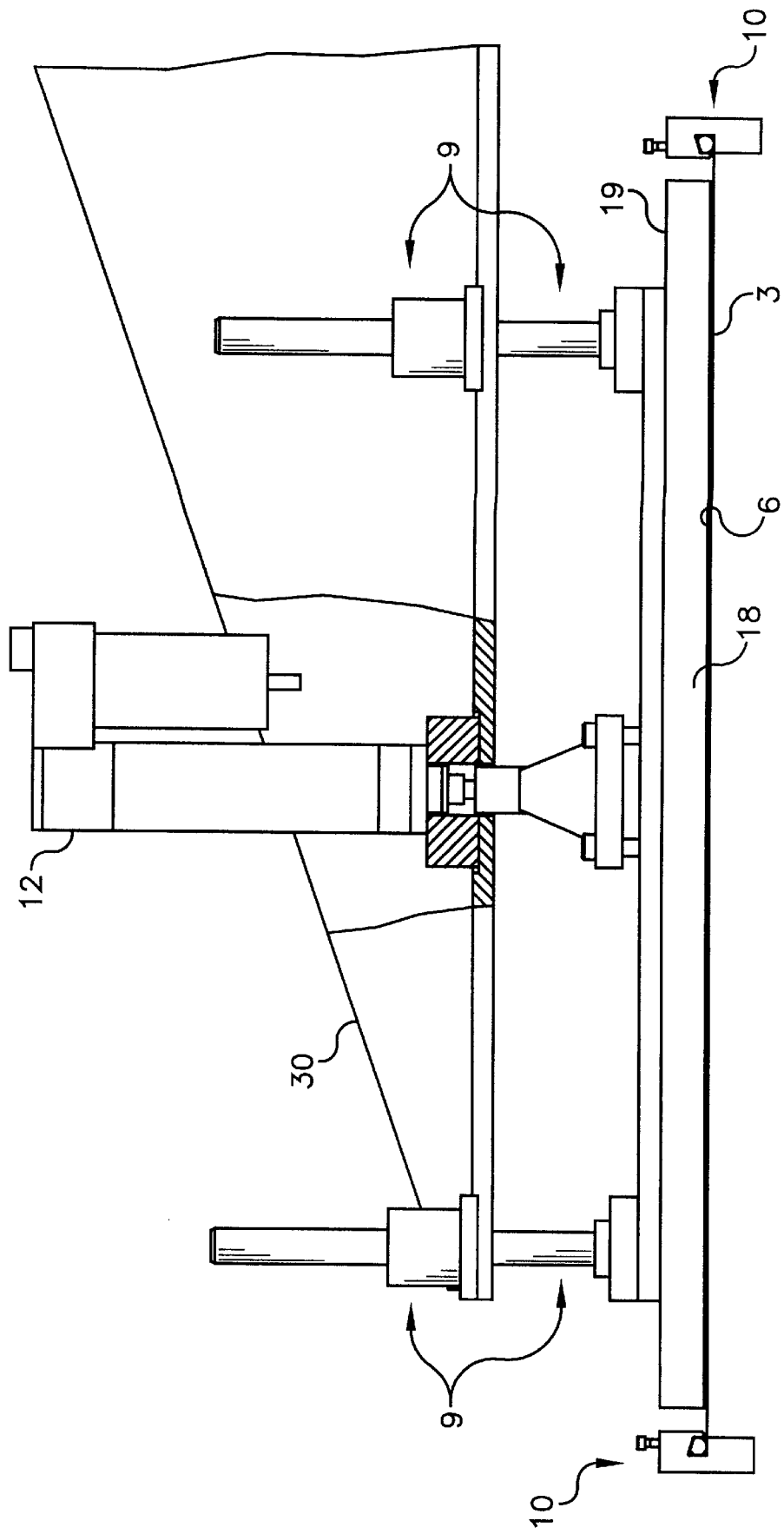
FIG. 6 is a general configuration drawing of the lenticular substrate gripper assembly and substrate measurement system (CCD Cameras). The CCD Cameras are not shown in the drawing.
Figure 7A:
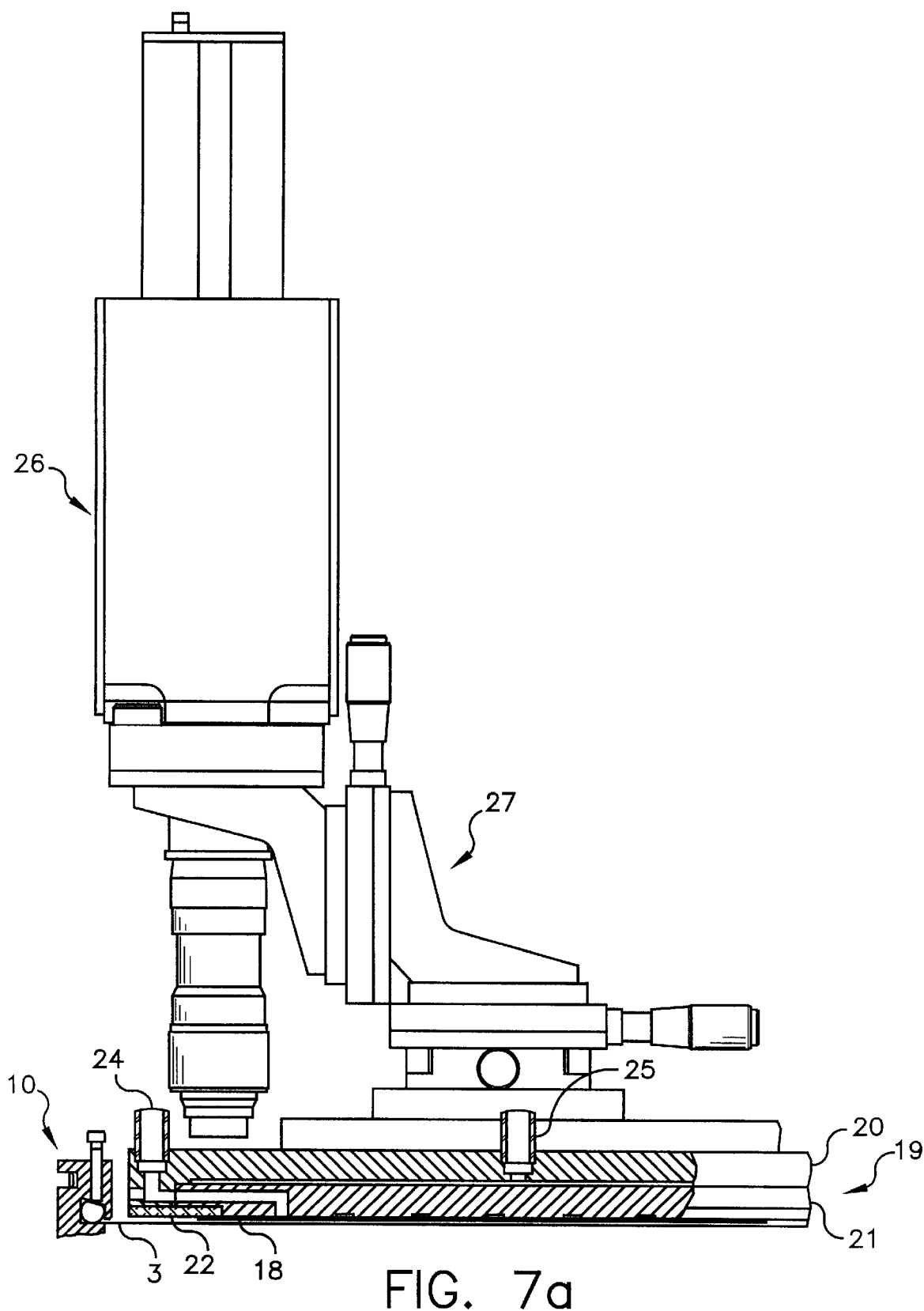
FIG. 7a and 7b are detailed drawings of the lenticular substrate gripper assembly and CCD cameras.
Figure 7B:
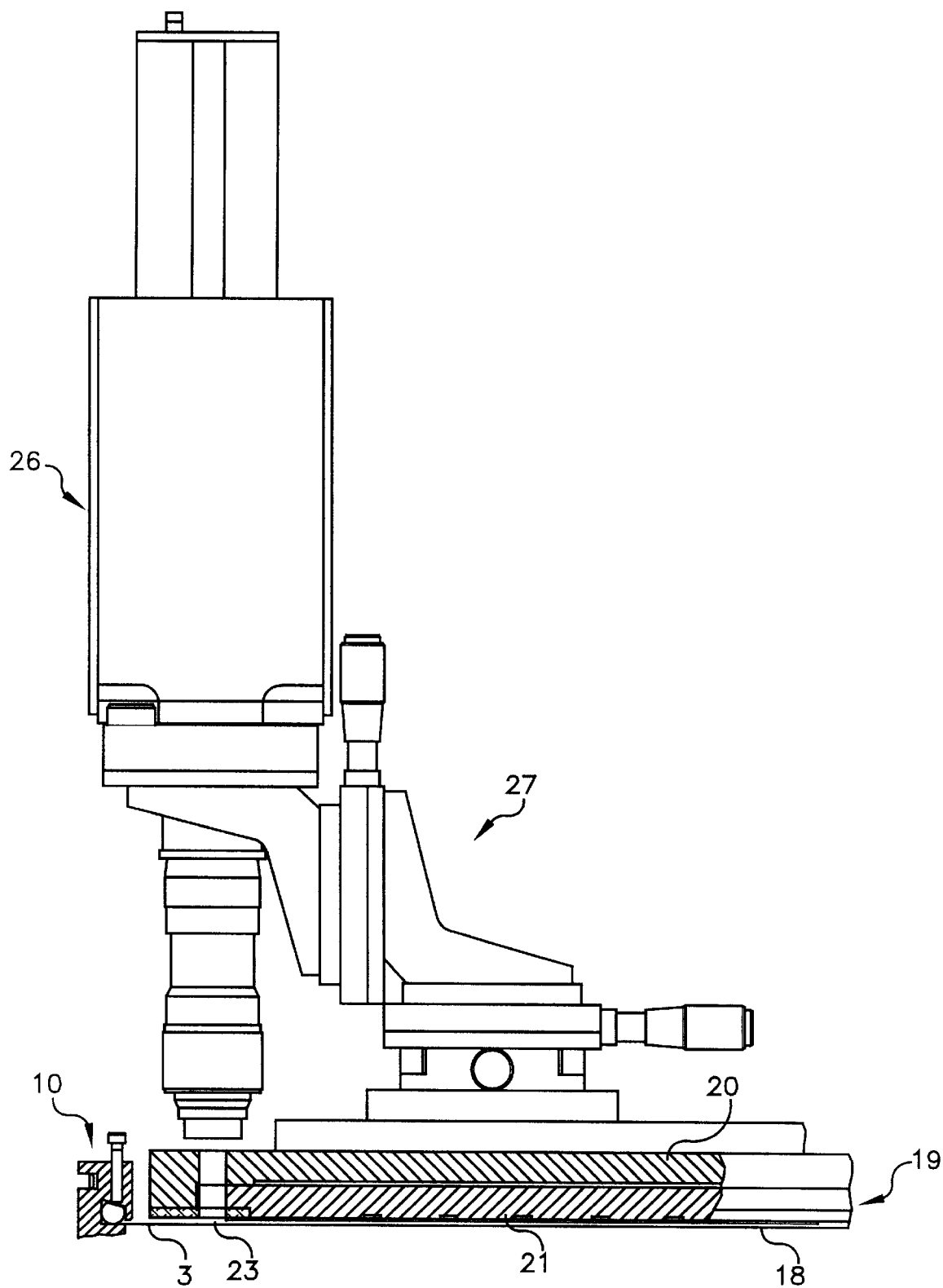

Referring to FIGS. 2, 3 and 6, the lenticular substrate (18) is positioned directly above the image substrate (3) with the emulsion coated (smooth) side adjacent to the emulsion side of the image substrate (3). A lenticular substrate gripping assembly (19) is located directly above the lenticular substrate (18). This gripping assembly (19) is attached to a plurality of guide rod and bearing assembly (9) and linear actuator (12), both of which are attached to the upper frame (30). The lenticular gripping assembly acts to grip and lift the lenticular substrate (18) in a manner that prevents any relative movement of the lenticular substrate with respect to the measurement cameras in the x and y directions. It also acts to lower and compress the lenticular substrate (18) into intimate contact with the image substrate (3). The gripping assembly (19) consists of a rigid plate (20) and a compliant vacuum gripper pad (21). The vacuum gripper pad (21) is secured to the rigid plate (20) via retaining plates (22). When it is necessary to secure the lenticular substrate (18) to the vacuum gripper pad (21) vacuum is applied via a plurality of vacuum delivery holes (24) and (25). Compressed air could be applied to the interface between the rigid plate (20) and the vacuum gripper pad (21) via the air delivery holes (25), should it be necessary to apply additional pressure during the exposure cycle.

CCD camera assemblies (26) and related optical lens elements are mounted to the xy stage assemblies (27), which is mounted to the rigid plate (20). The preferred configuration has a total of eight camera assemblies (26), four cameras positioned so as to detect the relative position of the four corners of the image substrate (3) and four other cameras positioned to detect the relative position of the four corners of the lenticular substrate. The image substrate detection cameras detect a fiducial pattern (23) on the image substrate. The lenticular substrate detection cameras detect a lenticular substrate fiducial pattern (28), which could be a uniquely shaped or missing lenticule. As described in EP Number 763755-A2 the measuring apparatus includes a light source for illuminating the first part, and a sensor for receiving light from the illuminated part. The sensor produces a signal corresponding to the first part.

As described in EP Number 763755-A2, a processor analyzes the signal and determines the location of the first part. The signal comprises spatially dependent data corresponding to the location of the first part. The location of the first part enables a precise determination of the location of the second part. By detecting and measuring the location of the lenticular substrate fiducial pattern (28) adjacent to lenticules in lenticular media, precise location can be easily and automatically achieved.

The normal operation of this apparatus begins by inserting the locking rods (17) into the clamping blocks (13), thereby rigidly constraining the clamping blocks to the mounting blocks (11). The image substrate (3) is inserted into the slot of all of the clamping blocks (13) of all clamping block assemblies. The clamping screws (16) on all clamping blocks are tightened to a torque adequate to sustain clamping pressure onto the image substrate. The locking pins (17) are then removed, thereby allowing the flexure clamping blocks to be compliant in the -X- direction. The linear actuators are actuated so as to move and stretch the image substrate to a "preload" position/condition.

The lenticular substrate (18) is then positioned above the image substrate (3) so that the lenticules (28) of the lenticular substrate (18) are running parallel to the lines in the image of the image substrate (3). The lenticular gripping assembly (19) is engaged so as to compress the lenticular substrate (18) together with the image substrate (3). The CCD cameras (26) then measure the fiducial features at the four corners of the two substrates and that data is sent to a processor. The processor calculates the relative positions of the (4) corners of both substrates and determines the offset "error" that needs to be corrected for. This error data is sent to a motion control processor, which then commands the four linear actuators to move.

Prior to inducing said move, the lenticular substrate gripping assembly (19) applies vacuum to grip the lenticular substrate (18). It then lifts the lenticular substrate (18) away from the image substrate (3), to permit the image substrate (3) to move freely. The linear actuators (5) are commanded to move the appropriate distance and direction, thereby inducing a lateral shift and/or an amount of stretch to the image substrate (3). Each linear actuator (5) is capable of moving a finite distance independently of the other linear actuators. As the linear actuators (5) continue to move, the image substrate begins to stretch and/or shift position on the glass platen (2). Following Poisson's Ratio, as the image substrate stretches along the -Y- axis, it will become narrower in the -X- direction, uniformly along both edges of the substrate. This invention allows a limited amount of -X- axis displacement to occur with a minimal amount of unwanted -Y- axis distortion of the horizontal lines in the image area.

Once the motions are complete, the lenticular gripping assembly (19) lowers the lenticular substrate (18) back into intimate and uniform contact with the image substrate (3) and properly re-engaged with the exact constraint members. If desired, the CCD cameras can take another set of readings and the processor can confirm that the correct motions have been accomplished. The substrates are now ready for the contact print exposing process to begin. Once the exposure process is completed, the lenticular substrate gripping assembly (19) will lift, allowing the lenticular substrate (19) to separate from the image substrate (3). The lenticular substrate (18) is then advanced (or removed) and the next cycle can begin.

The image substrate to be aligned to the lenticular substrate (18) is used in a contact printing operation to produce high quality images. The substrate can be any sheet material such as estar, acetate and the like. The lenticular substrate (18) can comprise of PETG material or the like, and contain perpendicular or vertical lenticules to which the image substrate (3) must be aligned.

The substrate supporting member can be glass, with anti-newton ring treatment which acts as a support for the substrate.

The actuator assemblies consist of stepper motor driven linear slide, precision encoder, and flexure linkage and include connecting rigid bar members that can be of aluminum, steel or the like.

Compliant substrate clamping members, which are connected to the rigid bar member, generally at 90° to the bar, engage with the other edges of the image substrate.

These clamping members are generally aluminum, steel or plastic.

The compliant gripper pad for the lenticular substrate comprises a plurality of vacuum grooves connected to an actuator means to engage the lenticular substrate to the image substrate. The grooves are for the purpose of delivery of vacuum, so as to generate a differential force capable of positively gripping the lenticular substrate and the compliant gripper pad can be comprised of silicone, urethane, or any compliant material.

The detecting means can be a camera such as a CCD camera.

The actuating means on the actuator assembly is preferably a high resolution stepper motor driven linear slides with precision encoder for closed loop feedback control.

While the invention has been described with particular reference to a preferred embodiment, it will be understood by those skilled in the art that various changes can be made and equivalents may be substituted for elements of the preferred embodiment without departing from the scope of the invention. In addition, many modifications may be made to adapt a particular situation in material to a teaching of the invention without departing from the essential teachings of the present invention.

PARTS LIST

1 Frame
2 Glass Plate
3 Image Substrate
4 Stretcher Bar Assembly
5 Linear Actuator
6 Flexure Mounting Bracket
7 Pivot Flexure
8 Adjusting Bar
9 Guide Rod and Bearing Assembly
10 Clamp Assembly
11 Mounting Block
12 Linear Actuator
13 Clamping Block
14 Flexure
15 Clamping Rod
16 Clamping Screw
17 Locking Rod
18 Lenticular Substrate
19 Lenticular Gripping Assembly
20 Rigid Plate
21 Compliant Vacuum Gripper Pad
22 Retaining Plates
23 Image Substrate Fiducial Pattern
24 Vacuum Delivery Holes
25 Air Delivery Holes
26 CCD Camera Assembly
27 XY θ Stage Assemblies
28 Lenticule Fiducial Pattern
29 Lenticule Features
30 Upper Frame
31 Image Lines
32 Emulsion Layer
33 Exposure System

We claim:

1. An apparatus for aligning a substrate having a plurality of image lines and a plurality of positioning patterns for exposure to a lenticular substrate, said apparatus comprising:
   a) a substrate having an image pattern consisting of a plurality of parallel image lines and a plurality of positioning patterns;
   b) a substrate supporting member which supports the substrate containing the image patterns;
   c) two actuator assemblies positioned on opposite sides of an image substrate, each actuator assembly including: a rigid bar member that connects to the two actuator assemblies, one on each end;
   d) a plurality of compliant substrate clamping members connected to the rigid bar member, which engage to edges of the image substrate;
   e) an image substrate having a plurality of parallel lenticular features;
   f) a constraint member for the lenticular substrate support comprising of a plurality of vacuum grooves, connected to an actuator assembly to cause the lenticular substrate to be uniformly engaged with the image substrate, when supported by the image substrate supporting member and while clamped along an outer periphery of said supporting member; and
   g) a substrate detecting means which detects the relative position of the the positioning pattern of said image substrate and which detects errors in position of the image substrate with respect to the lenticular substrate, when supported by the image substrate support member and clamped along the outer periphery; wherein
   said actuator assemblies include actuating means which elastically deform (stretch) and reposition the image substrate so as to correct for errors detected by said detecting means.

2. The apparatus of claim 1, wherein the said actuator means are high resolution stepper motor driven linear slides.

3. The apparatus as of claim 1, wherein the image substrate has a square or rectangular shape and said actuator means are positioned along two of the four sides and are along opposite sides of the substrate.

4. The apparatus of claim 1, wherein the image substrate is engaged to the actuator assemblies so that parallel image lines and positioning patterns are oriented perpendicular to the direction of motion of the actuator assemblies.

5. The apparatus of claim 1, wherein said detecting means are CCD cameras.

6. The apparatus of claim 1, wherein said constraint member is a compliant material.

7. The apparatus of claim 6 wherein the compliant material is silicone.

* * * * *